Figure 1:
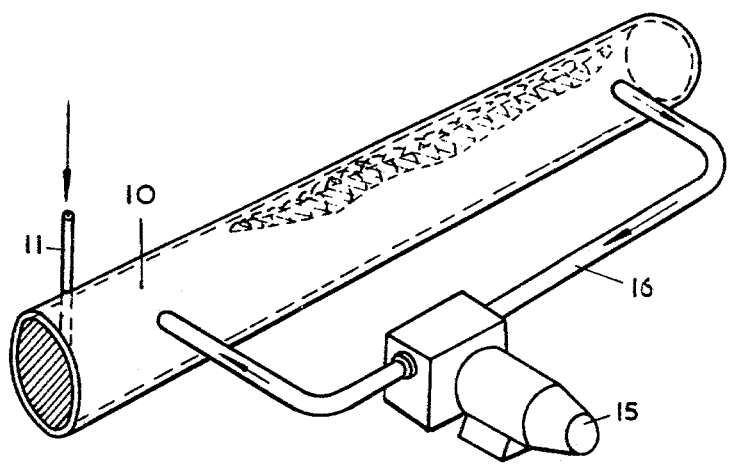

United States Patent [19]

Garrett et al.

[11] 4,196,074
[45] Apr. 1, 1980

[54] SEWAGE TREATMENT

[75] Inventors: Michael E. Garrett, Woking; Kenneth C. Smith, Roydon, both of England

[73] Assignee: BOC Limited, England

[21] Appl. No.: 852,103

[22] Filed: Nov. 16, 1977

[30] Foreign Application Priority Data

Nov. 18, 1976 [GB] United Kingdom ............... 48165/76

[51] Int. Cl.$^2$ .............................................. C02C 1/02
[52] U.S. Cl. ........................................ 210/3; 210/15; 210/63 R
[58] Field of Search .................... 210/3, 170, 8, 9, 14, 210/15, 60, 63 R

[56] References Cited

U.S. PATENT DOCUMENTS 3,525,685  8/1970  Edwards ............................. 210/170
3,734,850  5/1973  Karr .................................... 210/3

Primary Examiner—Thomas G. Wyse
Attorney, Agent, or Firm—Dennison, Dennison, Meserole and Pollack

[57] ABSTRACT

Oxygen containing gas is dissolved in sewage passing to, or through, a sewer during periods when sewage is being pumped therethrough. A stream of the sewage is withdrawn during periods when sewage is being held in the sewer. This stream is passed through a conduit so as to promote in such a stream dissolution of oxygen-containing gas introduced into, or entrained in, the stream. The stream is then returned to the sewer. By this means a chosen concentration of dissolved oxygen may be maintained in the volume of sewage between the points of withdrawal and return of the stream.

5 Claims, 2 Drawing Figures

SEWAGE TREATMENT

This invention relates to the treatment of sewage in a sewer.

In UK patent specification No. 1 452 961 it is proposed to treat sewage in a sewer by injecting oxygen-rich gas under pressure into the sewage in the sewer system in order to reduce the likelihood of the formation of hydrogen sulphide in the sewer and to reduce the amount of further treatment required to be carried out on sewage from the main. In a pumped or rising main, sewage, which is pumped through the sewer, is normally under a sufficient pressure to allow a quantity of oxygen-rich gas to be dissolved in the sewage passing through the sewage sufficient to meet the biochemical oxygen demand (BOD) of such sewage. However, in pumped sewerage systems where there are relatively long periods between pumping and where the topography is very flat when the sewage is subjected to only a static pressure head which may be very low, it is not uncommon for oxygen gas bubbles to rise to the surface of the sewage to form a gas pocket in the main above the sewage in the intervals between pumping. In this way, insufficient gas may remain dissolved in the sewage to meet its biochemical oxygen demand for the period between pumping with the result that hydrogen sulphide may be formed in the main. The gas in the aforesaid gas pocket can redissolve in the sewage to replace gas consumed by the bacteria in the sewage only when pumping recommences, the gas then being broken into fine bubbles. Each pumping period may however be insufficient to enable any significant quantity of such gas to dissolve in the sewage. Furthermore, although the bacteria in the sewage are continuously consuming oxygen dissolved in the sewage, further oxygen-rich gas is introduced into the sewage in the main only during the relatively short pumping periods so that the quantity of oxygen-rich gas required to be added during such periods in order to meet the biochemical oxygen demand of sewage in the main is quite likely to far exceed the solubility limit such gas in the sewage. In such circumstances, insufficient gas can be provided in the sewage to prevent the likelihood of hydrogen sulphide being formed in the main during the periods when the pump is not operating.

It is an object of the invention to provide apparatus and method for overcoming or ameliorating the aforementioned difficulties.

The invention provides a method of treating sewage pumped intermittently through a sewer, which method comprises dissolving an oxygen containing gas in sewage passing to, or through, the sewer during periods when sewage is being pumped through the sewer; withdrawing a stream of sewage from the sewer at a first position during periods when sewage is being held in the sewer passing such stream through a conduit so as to promote in such stream dissolution of oxygen containing gas introduced into, or entrained in, the stream, and then introducing the stream into the sewage in the sewer at a second position spaced along the sewer from said first position to maintain a chosen concentration of dissolved oxygen in the volume of sewage between said first and second positions.

The invention also includes apparatus for treating sewage pumped intermittently through a sewer including, a main pump for pumping sewage through a sewer, a conduit having an inlet in communication with the sewer at a first position and an outlet in communication with the sewer at a second position spaced apart from the first, and an auxiliary pump positioned in the conduit and means for introducing oxygen-containing gas into the sewage upstream of the first and second positions.

It is preferred that the aforesaid first position is upstream, conveniently adjacent the sewage pump, of said second position but in some applications this arrangement could be reversed so that oxygen containing gas is added to a stream of sewage having a relatively depleted dissolved oxygen content. The latter arrangement may assist solubility of the oxygen containing gas in the stream of sewage but the overall effect should be the same in either case.

The stream can be withdrawn using a low pressure high volume circulating pump which has a low power consumption.

The circulating pump may be sited conveniently at the pumping station for the rising main or pumping sewer, and connected to withdraw a stream of sewage from a position immediately downstream of the main pump.

It will be appreciated that the oxygenated sewage stream introduced into the sewage in the sewer flows along the sewer towards the aforesaid first position at which the stream is withdrawn from the sewer. In this way a plug of oxygenated sewage is established between the aforesaid first and second positions, which plug is displaced up the rising main sewer by a similar plug of oxygenated sewage when next pumping of sewage into the main takes place. Therefore, if the duration of each pumping period is a constant value, the distance up the main travelled by the aforesaid oxygenated plug can be calculated. The BOD of each litre of sewage during its overall retention time in the sewer can be measured, and the solubility limit for the static pressure head at any position in the sewer can be calculated. With this information, the required spacing between the aforesaid first and second positions can be calculated in order that the oxygenated sewage existing at the downstream one of those positions contains sufficient dissolved oxygen to reduce the likelihood of hydrogen sulphide being formed (or to prevent its formation altogether) in the sewage during the remainder of its passage through the sewer.

The oxygen containing gas introduced as aforesaid preferably has an oxygen content greater than that of air. Advantageously its proportion by volume of oxygen is greater than 80% and most preferably greater than 95%.

The aforesaid stream withdrawn from the sewer may comprise a mixture of sewage and undissolved oxygen-containing gas from a gas pocket thereof formed above the sewage in the sewer during periods when sewage is not being pumped through the sewer. Oxygen dissolution in the sewage is assisted in such stream as a result of the pressure of the stream and the formation in the stream of fine bubbles of oxygen-containing gas. Alternatively, oxygen containing gas may be introduced in fine bubble form (eg. 0.05–0.05 mm diameter) into the stream, e.g in a venturi device through which the stream is passed, such gas conveniently being taken from a gas pocket which forms above the sewage in the sewer.

Figure 2:
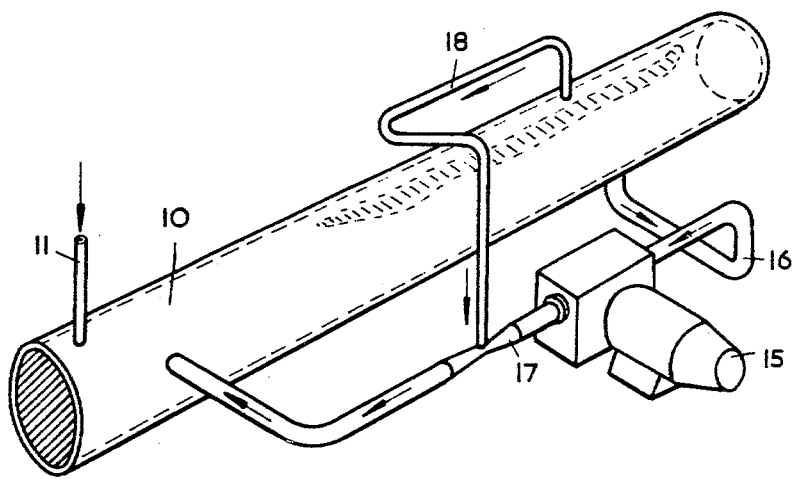

Two embodiments of a method and apparatus for treating sewage in accordance with the invention will now be described by way of example and with reference to the accompanying drawing in which:

FIG. 1 is a diagrammatic representation of a rising main sewer system embodying the invention; and, FIG. 2 is a diagrammatic representation of a second embodiment of the invention.

Referring to FIG. 1 of the drawings, there is shown a section of a rising main sewer 10 leading from a pumping station (not shown) at which there is located a main pump which pumps sewage through the sewer conduit 10. The pump is operated intermittently usually on an automatically controlled cycle in accordance with the particular rate at which sewage is delivered to the pumping station.

A gas pipe 17 extends into the conduit 10 and is connected to a pressurized supply of oxygen, e.g. a vacuum insulated vessel containing liquid oxygen and an outlet line therefrom containing a heat exchanger for vaporising the liquid gas. In this way oxygen is dissolved in sewage pumped through the conduit 10. In other embodiments, oxygen can be introduced upstream of the main pump or directly into the volute of such pump.

A further circulation pump 15, for example a type of pump which is capable of handling a gas/liquid mixture is located for example at the pumping station and is connected by conduit 16 to withdraw a stream of sewage from conduit 10 at one position and return it to conduit 10 at a second position spaced along the conduit therefrom.

When the main pump is not operating a pocket of oxygen rich gas liberated from the sewage forms at the top of the conduit. Therefore when the main pump is not operating, pump 15 is operated to cause a circulation of a mixture of sewage and oxygen rich gas from the aforesaid pocket through conduit 16 and the portion of sewer conduit 10 between the ends of conduit 16. During such circulation the undissolved oxygen gas is broken into fine bubble form so that it moves readily dissolves in the sewage stream pumped through conduit 16 to replace oxygen consumed by the micro-organisms in the sewage. In this way a plug of oxygenated sewage is maintained in sewer conduit 10 between the inlet and outlet ends of conduit 16. When pump 14 is operated once more, the pump 15 is stopped, and the oxygenated plug of sewage in conduit 10 is displaced further up the conduit by an incoming plug of sewage already oxygenated with gas from vessel 32. In this way the dissolved oxygen content of the plug of sewage displaced is maintained at a sufficiency high level to reduce the liklehood of hydrogen sulphide formation by bacterial action of the sewage during the remainder of its passage through conduit 10.

FIG. 2 shows a system similar to that shown in FIG. 1 except that the inlet of conduit 16 is at the bottom of the sewer conduit 10 to ensure that only a liquid phase is withdrawn. In addition a venturi 17 is located in conduit 16 downstream of pump 15 and a gas line 18 connects the gas pocket at the head of conduit 10 to the venturi 17. When pump 15 is operated sewage is circulated through conduit 16 and draws oxygen rich gas in fine bubble form into the sewage stream. In this system therefore the gas and liquid are withdrawn as separate streams through lines 17 and 16 respectively. In this way the system can be readily adapted to provide that required amount of gas is introduced into the sewage stream in conduit 16 and also obviates the need for a pump capable of pump at two phase mixtures.

In a typical example of an apparatus according to the invention, the length of the rising main sewer conduit is usually of the order of 2 to 5 miles and its diameter is usually in the range 10 to 36 ins. The main pump is usually operated for periods of 5 minutes three times an hour to 5 minutes every 3 hours and is shut down for intermediate periods. The diameter of conduit 16 is of the order of 4 to 6 inches in diameter and the spacing along the sewer conduit 10 of its inlet and outlet ends is about a quarter of a mile. The pump 15 when operated circulates sewage through conduit 16 at a rate in the range 10,000 gals/hr. to 100,000 gals/hr. and at a pressure in the range 5 p.s.i.g. to 10 p.s.i.g.

We claim:

1. A method of treating sewage pumped intermittently through a sewer, comprising:
    dissolving an oxygen-containing gas in sewage passing to, or through, a sewer pipe during periods when sewage is being pumped through the sewer pipe;
    withdrawing a stream of sewage from the sewer pipe at a first position only during periods when sewage is being held in the sewer pipe without pumping of said sewage within said sewer pipe;
    passing such stream through a conduit so as to promote in such stream dissolution of oxygen-containing gas introduced into or entrained in thhe stream; and,
    introducing the stream into the sewage in the sewer pipe at a second position spaced along the sewer pipe from said first position to maintain a chosen concentration of dissolved oxygen in the volume of sewage between said first and second positions, the stream being introduced into the sewer pipe only during periods when sewage is being held in the sewer pipe without pumping of said sewage within said sewer pipe.

2. A method as claimed in claim 1 wherein the first position is downstream of the second position.

3. A method as claimed in claim 1 wherein the oxygen-containing gas is oxygen or a gas mixture containing at least 80% by volume of oxygen.

4. A method as claimed in claim 3 and further comprising the step of introducing into the sewage passing within the conduit between the first position and the second position that oxygen-containing gas which comes out of solution in the sewage held between said first and second positions within the sewer pipe and which forms a gas pocket within the sewer pipe.

5. A method as claimed in claim 1 wherein plugs of oxygenated sewage are intermittently formed between the first and second positions during periods of alternate pumping and holding of sewage within the sewer pipe, the concentration of oxygen in each plug, the distance between the first and second positions, and the intervals between periods of pumping of sewage through the sewer pipe being selected so as to prevent the formation of hydrogen sulphide in the sewer.

* * * * *